Patented Jan. 3, 1950

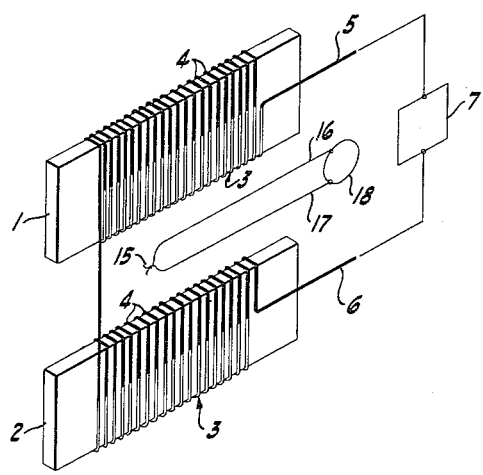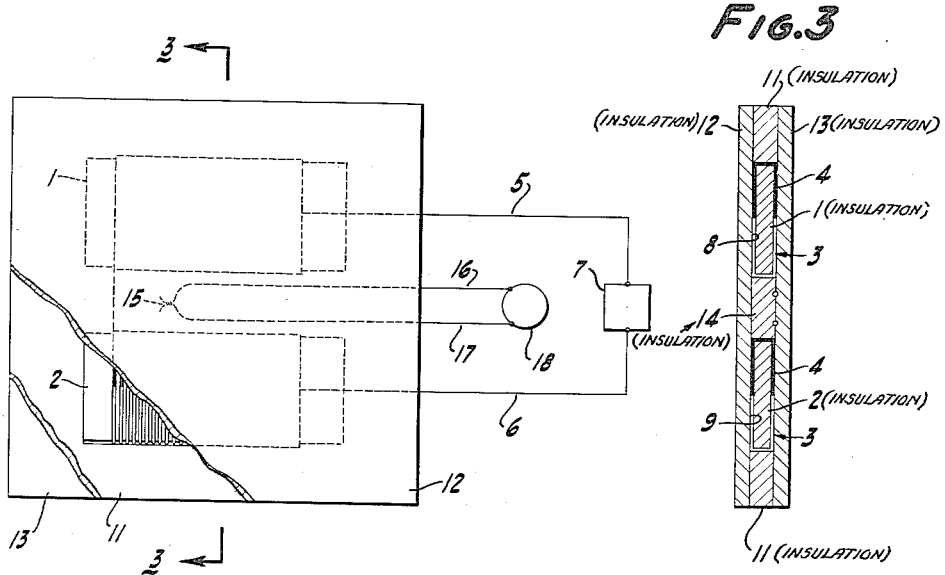

2,493,651

UNITED STATES PATENT OFFICE 2,493,651

THERMOELECTRIC HEAT FLOW RESPONSIVE DEVICE

Llewellyn M. K. Boelter, Los Angeles, Robert V. Dunkle, Concord, and Joseph T. Gier, Oakland, Calif., and Raymond C. Martinelli, Schenectady, N. Y., assignors to The Regents of the University of California, Berkeley, Calif.

Application February 13, 1948, Serial No. 8,046

2 Claims. (Cl. 136—4)

This invention relates to, and in general has for its object the provision of a meter suitable for measuring the steady state, transient or periodic heat flow into or out of walls, surfaces or other sources or sinks.

More specifically, the object of this invention is the provision of a heat flow meter wherein a pair of series-connected thermopile coils are each wound about a rectangular form, wherein these forms are bonded to, and within a relatively thin rectangular plastic shell, and wherein a thermocouple is also sealed within said shell between the two thermopile coils.

The invention possesses other advantageous features, some of which, with the foregoing will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings:

Fig. 1 is a side elevation of a heat flow meter embodying the objects of our invention and wherein portions thereof have been broken away better to illustrate its construction.

Fig. 2 is an isometric projection of the thermopile elements and thermocouple of our meter.

Fig. 3 is a vertical mid-section taken on the section line 3—3 of Fig. 1.

The meter illustrated in these figures includes a pair of identical, rectangular, coplanar plastic forms 1 and 2 each wound with a coil 3 of No. 36 constantan wire, the upper half of each coil being electroplated with silver or copper 4. Each core and its silver plated thermocouple junctions may, therefore, be considered as a thermopile element, and in this connection it should be noted that other thermoelectric materials can be substituted for the constantan wire and its silver or copper plating. As shown in Figs. 1 and 2, the coils 3 of the two elements are connected in series with each other and provided with leads 5 and 6 for connecting them to a thermocouple potentiometer 7.

The two forms 1 and 2 are snugly accommodated within a pair of parallel, rectangular cutouts 8 and 9 formed in a central, rectangular plastic core or frame 11 of a gauge substantially equal to the gauge of the sheet from which the forms 1 and 2 are made. Disposed on either side of the central frame 11 and cemented thereto so as to form an integral structure therewith are plastic plates 12 and 13, the dimensions of these plates being substantially identical to the dimensions of the frame 11. Cemented between the central crossbar 14 of the frame 11 and the plate 13 is a small thermocouple 15 and its leads 16 and 17 for connecting it with a suitable potentiometer 18.

Although the dimensions of the heat flow meter so formed are not critical, conveniently it can be made about four inches square and about 0.05 inch thick, and each of the forms 1 and 2 wound with 160 turns of silver electroplated No. 36 constantan wire. Half of the thermocouple junctions of each form are in contact with one side thereof, and the remainder with its opposite side.

The operation of a meter of this type is based on the fact that a definite relation exists between the temperature drop across and the rate of heat flow through a fixed thermal resistance, and that the electromotive force generated by its thermocouples is proportional to the temperature drop across its thermopile elements (forms 1 and 2) resulting from a flow of heat through the meter. Consequently after proper calibration, the meter can be used to measure rates of heat transfer. All normal meter readings can be made with the thermocouple potentiometer 7 which conveniently can have a range of about 40 millivolts and which corresponds to a rate of heat transfer through the meter of about 700 B. t. u./hr. ft.$^2$.

Since the thermoelectric power of the thermocouple junctions of the thermopile, the thermal conductivity of the material upon which the thermopile is wound, and the distance between the "hot" and cold junctions (due to the expansion or contraction of the forms 1 and 2) all vary with the temperature for a given value of heat flow through the meter, the electromotive force generated by the thermopiles will vary with the heat meter temperature, $t_m'$.

However, since the thermopile electromotive force varies consistently with the heat meter temperature, it becomes readily possible to plot a curve showing the magnitude of the variation of the thermopile electromotive force at any given temperature of the meter. It is for this purpose that the thermocouple 15 is incorporated as an integral part of the meter.

Our heat flow meter can be calibrated by means of a hot plate arranged to provide an unidirectional heat flow between opposite faces thereof, a calibration constant being thereby obtained at a datum temperature $t_m°$. In using the meter to determine the heat flow at any other temperature $t_m'$, the direct reading of the potentiometer 7 is corrected by applying the factor indicated by the curve above referred to.

As above indicated, the dimensions of our meter are not critical, and furthermore, it is not necessary that either its thickness or its conductivity be predetermined or known. Nor is it necessary to know how its thickness and conductivity vary with its temperatures. By resorting to a plated type of thermocouple it is possible to use a larger number of junctions in a given space than would otherwise be possible, thereby resulting in a very sensitive and accurate meter.

We claim:

1. A heat flow meter comprising: a central electrical insulating plate formed with a cut out therein; a form-plate of a thickness substantially equal to the thickness of said central plate accommodated in said cut out, said form-plate being made of an electrical insulating material; a plurality of turns of wire wound about said form-plate, each of said turns being electroplated over a portion of its length extending from one side of said form-plate to the other side thereof with a metal dissimilar to the metal from which said wire is made so as to form a thermopile having a series of thermocouples lying on each side of said form-plate; an electrical insulating cover plate sealed to and over each side of said central plate so as to form an integral structure therewith; and leads connected to the terminals of said thermopile and extending edgewise through said meter.

2. A heat flow meter comprising: an outer plate made of an electrical insulating material and provided with an interior recess; an inner plate sealed within said pocket and wound with a plurality of turns of wire, each turn thereof being electroplated over a portion of its length extending from one side of said inner plate to the other side thereof, with a metal dissimilar to the metal from which said wire is made so as to form a thermopile having alternate junctions lying on opposite sides of said inner plate; leads extending through said outer plate in circuit with the terminals of said thermopile; and a thermocouple sealed within said outer plate and provided with leads extending therethrough, said thermocouple having no electrical connection with said thermopile.

LLEWELLYN M. K. BOELTER.
ROBERT V. DUNKLE.
JOSEPH T. GIER.
RAYMOND C. MARTINELLI.

REFERENCES CITED

The following references are of record in the file of this patent:

UNITED STATES PATENTS

| Number | Name | Date |
|---|---|---|
| 1,528,383 | Schmidt | Mar. 3, 1925 |
| 1,643,734 | Zworykin | Sept. 27, 1927 |
| 1,685,973 | Alexander et al. | Oct. 2, 1928 |